United States Patent [19]
Kochert

[11] Patent Number: 4,551,851
[45] Date of Patent: Nov. 5, 1985

[54] CIRCUIT ARRANGEMENT FOR MACHINE CHARACTER RECOGNITION

[75] Inventor: Wilfried Kochert, Constance, Fed. Rep. of Germany

[73] Assignee: Computer Gesellschaft Konstanz mbH, Fed. Rep. of Germany

[21] Appl. No.: 610,180

[22] Filed: May 14, 1984

Related U.S. Application Data

[63] Continuation of Ser. No. 279,360, Jul. 1, 1981, abandoned.

[30] Foreign Application Priority Data

Jul. 9, 1980 [DE] Fed. Rep. of Germany ....... 3026055

[51] Int. Cl.⁴ ............................................. G06K 9/70
[52] U.S. Cl. ..................................................... 382/38
[58] Field of Search ................................... 382/36–39

[56] References Cited

U.S. PATENT DOCUMENTS

| | | | |
|---|---|---|---|
| 3,182,290 | 5/1965 | Rabinow | 382/38 |
| 3,267,432 | 8/1966 | Bonner | 382/37 |
| 3,271,739 | 9/1966 | Bonner | 382/37 |
| 3,576,976 | 5/1971 | Russo et al. | 382/36 |
| 3,988,715 | 10/1976 | Mullan et al. | 340/146.3 |
| 4,246,570 | 1/1981 | Kochert et al. | 340/146.3 |
| 4,326,259 | 4/1982 | Cooper et al. | 382/36 |

Primary Examiner—Leo H. Boudreau
Attorney, Agent, or Firm—Hill, Van Santen, Steadman & Simpson

[57] ABSTRACT

A level classifier comprises a group classifier and a plurality of sub-classifiers respectively assigned to a group. Each character is first assigned with the assistance of the group classifier to one of the n respective groups and then, to the specific group sub-classifier in which the actual character recognition occurs.

6 Claims, 2 Drawing Figures

CIRCUIT ARRANGEMENT FOR MACHINE CHARACTER RECOGNITION

This application is a continuation of application ser. No. 279,360, filed July 1, 1981, now abandoned.

BACKGROUND OF THE INVENTION

1. Field of the Invention

The present invention relates to a circuit arrangement for machine character recognition having a classifier following a sampler and an editor, the classifier calculating an assignment of the respectively-sampled character to one of a total of Z character classes on the basis of stored classifier coefficients.

2. Description of the Prior Art

In modern data technology, machine character recognition is gaining increasing significance, in conjunction with data acquisition and data input. For this purpose, in the interest of low substitution and rejection rates, high requirements are made of the recognition certainty. It is therefore necessary for certain character recognition that not only the characteristic features of the character to be classified be evaluated in view of applicability to a specific character class but, rather, that its characteristic differences, in comparison to the representatives of all other classes, be likewise evaluated. This is still relatively simple given a set of characters of approximately 10 characters to be recognized, for example for the numerals 0–9, particularly with standardized character fonts, OCR-A and OCR-B.

If, in contrast thereto, the set of characters to be respectively evaluated by a classifier is increased, then the classification results deteriorate approximately quadratically as a function of the overall number of characters to be distinguished, i.e. a classification of, for example, 30 character classes produces values of the magnitudes characterizing the quality of the recognition which are poorer by approximately the factor 9 than a classification of only 10 classes of characters. Moreover, upon employment of a non-linear classifier system, considerable problems arise with respect to the chronological expense, because approximately 500–1000 computing operations per character class are required for the calculation of the classifier values necessary for the recognition of the individual characters. Since this occurs to the detriment to the reading rate, the computational work would of necessity have to be distributed to a plurality of computational units which would significantly increase the circuit expense and, therefore, the price of the classifier.

SUMMARY OF THE INVENTION

The object of the present invention is to provide a circuit arrangement by which a sufficiently high reading certainty can be achieved even given an increase number of character classes, without the technical expenses of the circuit being correspondingly increased.

The above object is achieved, according to the present invention, and in a circuit arrangement of the type generally mentioned above, in that the classifier exhibits a group classifier which respectively assigns each character to one of n groups. A respective sub-classifier is provided for each of the n groups for Z/n respective character classes. Both the group classifier and all sub-classifiers are connected to a common computational unit. The advantages of a level classifier constructed in such a manner is, particularly, that it requires far less computational expense for the classification of the character in comparison to an overall classifier. Whereas, namely, a known classifier would accordingly have to calculate 39 estimated values for, for example, 39 character classes, given a level classifier according to the present invention with a group classifier and three sub-classifiers for 13 respective classes each, only three estimated values need be calculated in the group classifier and 13 estimated values need be calculated in each of the respective sub-classifiers, i.e. a total of only 16 estimated values.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 3 is a schematic diagram of a group classifier for a character set of 39 different character classes.

DESCRIPTION OF THE PREFERRED EMBODIMENT

Figure 1:
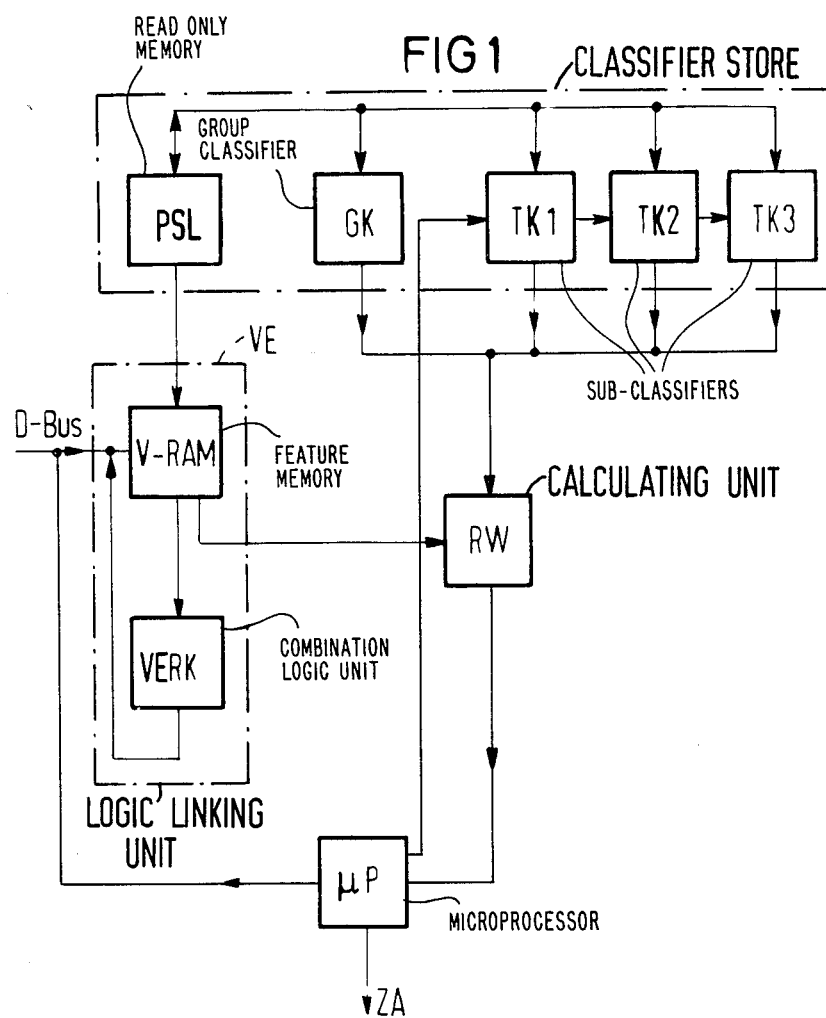
FIG. 1 is a block diagram of a classifier constructed in accordance with the present invention.

FIG. 1 illustrates a classifier comprising a group classifier GK and three sub-classifiers TK1–TK3 which are connected star-shaped to a computational unit RW which is shared, in common, by all classifiers. The group classifier GK and the sub-classifiers TK1–TK3 are, preferably, quadratic polynomial classifiers in which the class membership of a character pattern is expressed by a calculated estimated value function. Furthermore, the classifier has a combination logic unit VE with a feature memory V-RAM in which a bit pattern of a previously-edited character can be inscribed by way of a data bus (D-BUS). The logic linkage addresses, which are addresses for the components of a combination of features, necessary for the character recognition are stored in a read only memory PSL of a classifier memory shared in common by all classifiers, the classifier memory being driven by an address counter (not shown). The character recognition now occurs in such a manner that the features read from the feature memory V-RAM are supplied to the combination logic unit VERK. The linkage of the combination of features carried out in the combination logic unit VERK thereby occurs in such a manner that a "1" always occurs when the content of the two logic linkage addresses belonging to a combinaton of features is "1", whereas a "0" occurs in the other cases. These results are serially written into an address area of the feature memory V-RAM specifically provided for that purpose. With the assistance of the classifier coefficients assigned to the group classifier, estimated values are calculated in the computational unit RW with these previously formed and stored results of the feature combinations, the estimated values first assigning the sampled character to one of n character groups. These first estimated values are subsequently supplied to a microprocessor μP whose task, in addition to various other tasks within the character recognition circuit consists of selecting the respectively appertaining sub-classifier TK1 or TK2 or TK3 on the basis of the character group assignment undertaken by the group classifier GK. On the basis of the classifier coefficients specified for each sub-classifier, second characteristic estimated values are then calculated for the character to be respectively evaluated and are relayed to the microprocessor μP at whose output the character output ZA then occurs.

Figure 2:
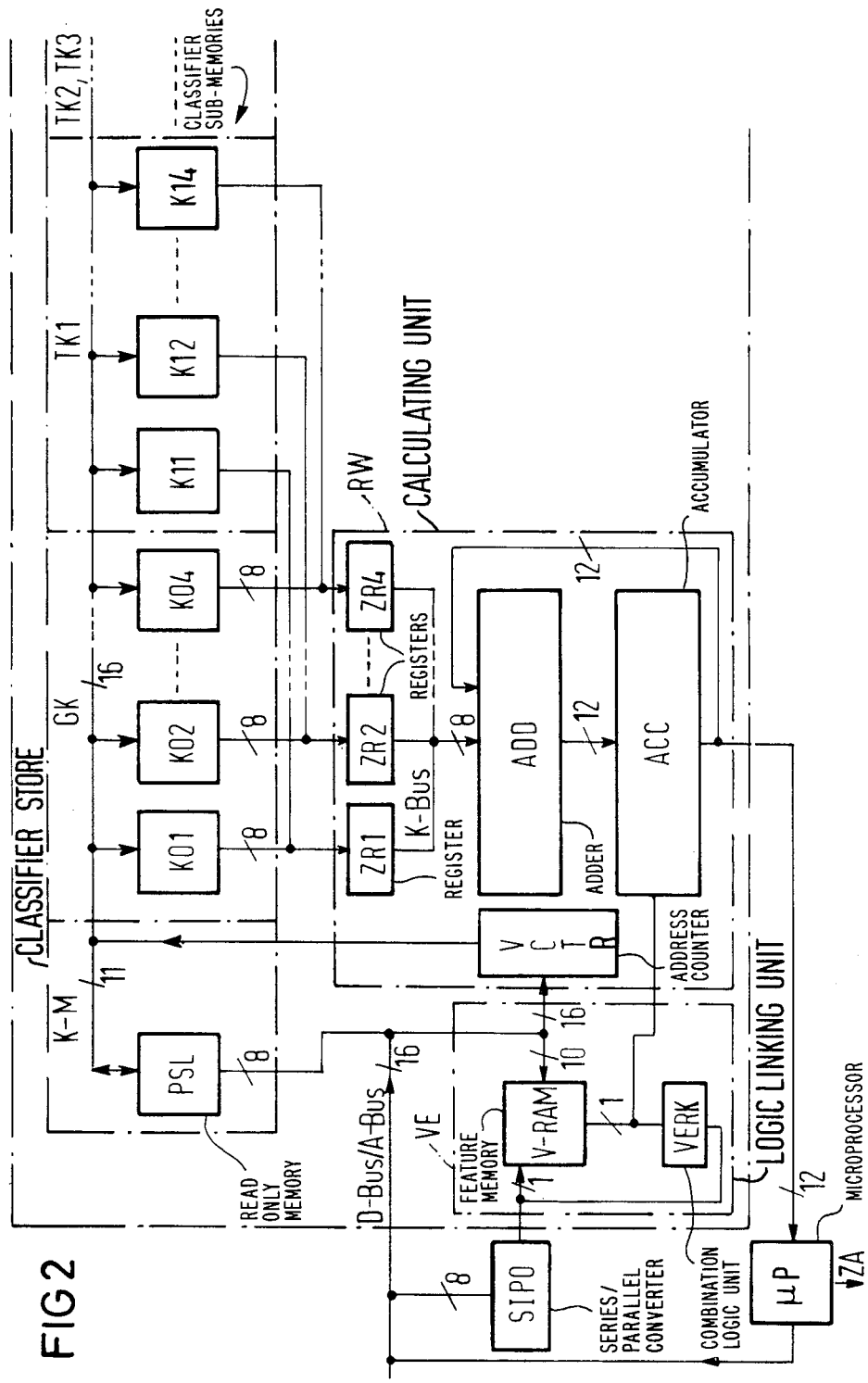
FIG. 2 is a detailed logic block diagram of the classifier of FIG. 1.

The circuit of FIG. 1 with the combination logic unit VE, of the computational unit RW, the classification memory K-M with the read only memory PSL, and the microprocessor μP are illustrated in greater detail in FIG. 2. In addition to the aforementioned read only memory PSL, the classifier memory K-M contains a plurality of sub-memories in which the classifier coefficients of the individual classifiers are stored. Therefore, the sub-memories KO1, KO2 ... KO4 are assigned to the group classifier GK, whereas the sub-memories K11, K12 ... K14 are assigned to the first sub-classifier TK1 and the further sub-memory groups of four (not illustrated) are assigned to the sub-classifiers TK2 and TK3. The accommodation of the coefficients respectively assigned to a classifier, i.e. to a sub-memory group of four, is thereby advantageously undertaken in such a manner that the first coefficient of the first character class is located in the first sub-memory, the second is located in the second sub-memory, etc, and the fifth is then again located in the first sub-memory. Overall, each character class has, for example, 764 coefficients. The arrangement of the coefficients in the individual sub-memory groups of four makes it possible to successively calculate the estimated values of the individual character classes in 764 computational steps each. The outputs of the four sub-memories respectively assigned to the group classifier or, respectively, to the three sub-classifiers are connected to a respective intermediate register ZR1–ZR4 of the computational unit RW, so that four respective coefficients can be transferred in parallel into the intermediate registers. These four registers are driven by an address counter VCTR, which also addresses the individual sub-memories, in such a manner that tri-state outputs of the individual registers are successively through-connected. Therefore, the coefficients on the classifier bus K-Bus successively pend at the actual computational circuit, comprising an adder ADD and an accumulator ACC. The appertaining bit pattern and the combination results are simultaneously read from the feature memory V-RAM and are supplied to the accumulator ACC. Only when the appertaining linkage is "1", is the corresponding coefficient added in the accumulator ACC. When the respective estimated value of a character group has been completely calculated, then the same is read from the accumulator ACC and is supplied to the microprocessor μP which then, after evaluation of all estimated values, either causes the character output ZA or, insofar as it is a matter of an intermediate result of the group classifier GK, causes the selection of the respectively appertaining sub-classifier for the final classification of the character.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for machine character recognition comprising:

a classifier device comprising a group classifier and a plurality of sub-classifiers each storing classifier coefficients;

a feature memory for receiving and storing a respective bit pattern corresponding to each respective character to be classified, said feature memory connected to said classifier device;

a read-only memory for storing link addresses of the data contained in the feature memory and the appertaining classifier coefficients contained in said classifier device, said read-only memory connected to said group classifier and to said plurality of sub-classifiers and to said feature memory;

an arithmetic unit for calculating first and second estimated values assigned to the individual character classes within a character set from the bit pattern, stored in said feature memory for classification, on the basis of the classifier coefficients, said arithmetic unit connected to said feature memory and to said group classifier and said subclassifiers; and a microprocessor connected to said feature memory and to said arithmetic unit, said group classifier storing such character coefficients that the character to be classified is respectively assigned to one of n character groups on the basis of the calculated first estimated values, said microprocessor operable to select a respective subclassifier for each of the n groups and respectively assigned to different $Z/n$ character classes as a function of the first estimated values, where $Z$ is the total number of classes within the character set, said microprocessor further operable in response to the classifier coefficients received from one of said subclassifiers and the second estimated values calculatable therefrom by said arithmetic unit to supply an output signal defining the character classified.

2. The arrangement of claim 1, wherein: said group classifier assigning different character classes to the individual subclassifiers in such a manner that characters which share many characteristic features and which differ only from one another by a few characteristic features are assigned to the same sub-classifiers.

3. The circuit arrangement of claim 2, and further comprising:

a plurality of sub-memories as a part of each of said group and sub-classifiers for receiving classifier coefficients assigned thereto, said sub-memories receiving the individual coefficients in such a manner that the first coefficient of a first character class is located in the first sub-memory of a group, the second is located in the second sub-memory of the group, the $m^{th}$ is located in the $m^{th}$ sub-memory, and the $m+1^{th}$ coefficient is located in the first sub-memory.

4. The circuit arrangement of claim 3, and further comprising:

an address counter connected to and controlling the operation of said feature memory and said sub-memories.

5. The circuit arrangement of claim 4, and further comprising:

a data bus for carrying the feature data; and a series/parallel converter connected between said data bus and said feature memory.

6. The circuit arrangement of claim 5, and further comprising:

a plurality of intermediate registers in said arithmetic unit connected to said sub-memories of said group and sub-classifiers so that m respective classifier coefficients can be read in parallel;

an adder connected to said intermediate registers;
an accumulator connected to said adder; and
said microprocessor connected to said accumulator for calculating the outputs thereof.

* * * * *